United States Patent [19]

Credali et al.

[11] Patent Number: 4,880,847
[45] Date of Patent: Nov. 14, 1989

[54] THERMOPLASTIC POLYURETHANE ENDOWED WITH IMPROVED CHARACTERISTICS OF RESISTANCE TO HEAT DISTORTION

[75] Inventors: Lino Credali, Casalecchio Di Reno; Carlo Mulas, Mogliano Veneto; Ermanno Benetti, Mirano; Gianflavio Lunardon, Padua, all of Italy

[73] Assignee: Ausimont S.p.A., Milan, Italy

[21] Appl. No.: 75,965

[22] Filed: Jul. 21, 1987

[30] Foreign Application Priority Data

Jul. 23, 1986 [IT] Italy ............................ 21208 A/86

[51] Int. Cl.$^4$ .................. C09B 29/22; C08G 18/28
[52] U.S. Cl. ........................... 521/157; 528/73
[58] Field of Search ............... 528/73; 521/157

[56] References Cited

U.S. PATENT DOCUMENTS

| | | | |
|---|---|---|---|
| 3,719,639 | 3/1973 | Reetz et al. | 528/73 |
| 4,026,833 | 5/1977 | D'Alelio | 521/157 |
| 4,124,568 | 11/1978 | Zecher et al. | 528/73 |
| 4,383,051 | 5/1983 | Meyberg et al. | 528/73 |
| 4,430,454 | 2/1984 | Lastrantas et al. | 521/157 |
| 4,481,339 | 11/1984 | Bolon | 528/73 |
| 4,496,715 | 1/1985 | Sattler | 528/288 |
| 4,529,742 | 7/1985 | von Bonin et al. | 528/73 |

Primary Examiner—John Kight
Assistant Examiner—Dennis R. Daley
Attorney, Agent, or Firm—Stevens, Davis, Miller & Mosher

[57] ABSTRACT

A thermoplastic polyurethane endowed with improved heat distortion resistance, which comprises the product of reaction of at least one polyisocyanate, preferably an organic diisocyanate;

at least one polyol material reactive with the isocyanate and having a molecular weight higher than 400;

a chain extender having a molecular weight lower than 400; and an aromatic anhydride having the formula (I):

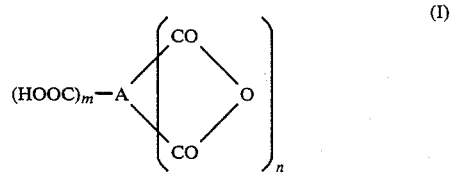

wherein A is a possibly substituted ($C_6$–$C_{30}$) aromatic radical, m may be 0 or an integer from 1 to 3, and n is an integer equal to 1 or 2.

13 Claims, No Drawings

THERMOPLASTIC POLYURETHANE ENDOWED WITH IMPROVED CHARACTERISTICS OF RESISTANCE TO HEAT DISTORTION

DESCRIPTION OF THE INVENTION

The present invention relates to thermoplastic foamed polyurethane resins (either cellular or non-cellular) endowed with improved characteristics of heat distortion resistance.

More precisely, the present invention relates to thermoplastic polyurethane resins wherein a particular aromatic anhydride is used, which gives the product the above-said improved characteristics of resistance to heat distortion.

The thermoplastic polyurethane of the present invention is used in a wide range of applications, among which, for purely exemplifying purposes the following may be mentioned: parts of car bodies, bodies or casings for equipment pieces, mechanical parts and the like, made according to conventional manufacturing techniques, such as thermoforming, extrusion, injection molding, and so on.

The considerable heat resistance which characterizes the thermoplastic polyurethane according to the present invention, both as to heat distortion resistance and thermal decomposition, makes much easier the manufacturing of the end articles during the processing of the material in the molten state.

It is known that polyurethanes are produced by reacting long-chain polyols, having a molecular weight within the range of from 400 to 10,000, with organic polyisocyanates, preferably diisocyanates, and chain extenders generally constituted by short-chain glycols, polyols or amines, having a molecular weight lower than 400.

But the use of these starting materials for the purpose of preparing products having as high properties of structural strength as the thermoplastic materials known as technopolymers, such as, e.g., nylon, or the like, is limited by the need of having to resort to the use of such reinforcing materials as fiberglass, for the purpose of achieving the desired levels of stiffness, impact-resistance, etc.

It is known that the properties of polyurethanes, in particular their hardness, can be changed over a wide range of values ranging between those of very soft materials and those of low-flexibility hard materials, by varying the mutual ratio of the various components: polyols, polyisocyanates and chain extenders, used in their preparation. In particular, this change in properties can be achieved by varying, with the amount of —NCO groups being the same, the weight ratio of the long-chain to the short-chain polyol.

It is known, in fact, that the polymer chain units derived from the low-molecular-weight extender and polyisocyanate form the hard segments having a high elastic modulus; while the polymer chain units derived from the high-molecular-weight polyol form the soft segments having a low elastic modulus due to the presence of the long polyol chain. In case of an essentially linear polyurethane prepared from a diisocyanate, a difunctional polyol, and a difunctional chain extender, the increase in the percentage of weight of the chain extender relative to the polyol introduces into the chain a higher percentage of hard segments, and renders the polyurethane harder and harder, but with a tendency to brittleness; i.e., the material, although it is still thermoplastic, loses its elastomeric characteristics. The no longer elastomeric material has, as a function of the percentage of hard segments, a hardness higher than 50 Shore D, and a high flexural modulus.

From U.S. Pat. No. 3,356,650, the preparation is known of a thermoplastic polyurethane which has a hardness even higher than 70 Shore D, by using high ratios of the hard to the soft segments. According to the process as disclosed in that patent, thermoplastic polyurethanes are produced by reacting the organic polyisocyanate with a mixture of reactants constituted by at least one compound containing at least three active hydrogen atoms, and other organic compounds containing two active hydrogen atoms, as determined according to the Zerewitinoff method; said active hydrogen atoms being reactive with the isocyanate group.

The so-obtained hard polyurethanes are endowed with a high resistance to heat distortion, and with a high hardness which can be even higher than 80 Shore D; however, when particular polyisocyanates and/or diols and/or particular process conditions are used, the thus-obtained polyurethanes can be brittle and hence unsuitable for use in those fields wherein a performance of polymers of the engineering type is required.

U.S. Patent No. 4,376,834 discloses a thermoplastic polyurethane characterized by a high impact strength, a high flexural modulus, and a heat distortion temperature of at least 50° C. at 1.82 MPa, which is obtained by reacting: (a) an organic polyisocyanate; (b) a polyol reactive with the isocyanate group, having a functionality not lower than 1.9, a glass transition temperature ($T_g$) lower than 20° C., and a molecular weight within the range of from 500 to 20,000; and (c) a diol, as the chain extender, having a molecular weight lower than 400, wherein the percentage by weight of polyol (b) is within the range of from 2 to 25%, and the NCO/OH number-average ratio is within the range of from 0.95:1 to 1.05:1.

However, the thus-obtained polyurethanes show a notalways-satisfactory heat distortion temperature, in particular for those applications in which such a characteristic is required, such as in the car field, in the electronic field, etc.

It has now been discovered in accordance with the present invention that the heat distortion resistance of thermoplastic polyurethanes may be improved by carrying out the polymerization in the presence of particular aromatic anhydrides.

Therefore, the object of the present invention is to provide thermoplastic polyurethanes comprising or consisting essentially of the reaction product of:

(a) at least one organic polyisocyanate, preferably a diisocyanate;

(b) at least one polyol reactive with the isocyanate and having a molecular weight higher than 400;

(c) a chain extender having a molecular weight lower than 400; and (d) at least 5% by weight, relative to the components (b+c) containing reactive hydrogens, according to the Zerewitinoff method, of at least one aromatic anhydride having the formula (I):

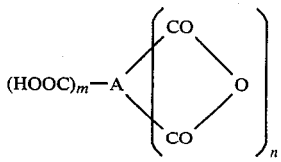

(I)

wherein A represents an aromatic radical containing from 6 to 30 carbon atoms, possibly substituted on the ring, m may be 0 or an integer from 1 to 3, and n is an integer equal to 1 or 2.

The polyurethanes of the present invention may be obtained both in cellular and non-cellular shape, according to the operating conditions used, which however are per se of conventional type, as is fully explained hereunder.

Within the scope of the present disclosure, the term "heat distortion temperature (HDT)" relates to the measurement of the polymer resistance to distortion caused by heat, and corresponds to the temperature (° C.) at which occurs the distortion of a polyurethane specimen, having defined dimensions and shape, under the action of a flexural load having a determined value, according to ASTM Standard D 648-56.

The presence of the aromatic anhydrides having the formula (I) allows one to introduce into the polymer chain new structural groups of the imidic type which, surprisingly, involve an increase in heat distortion temperature (HDT) of the material. However, in no way should this explanation of structural-chemical character be understood as conditioning or limiting the scope of the present invention.

The aromatic anhydrides having the formula (I) are per se known compounds, commercially available, or can be prepared according to conventional techniques.

Examples of anhydrides having the formula (I) are trimellitic anhydride, pyromellitic anhydride, benzophenonone-tetracarboxy acid di-anhydride, perylene-3,4,9,10-tetracarboxy acid di-anhydride, and so forth.

In the preparation of the polyurethane of the present invention, anhydrides containing on their ring substituents consisting of radicals not reactive with isocyanate, such as, e.g., ($C_1$-$C_6$)-alkyl radicals, may also be used. Trimellitic anhydride and pyromellitic anhydride are preferred.

In the polyurethanes of the present invention, the amount of aromatic anhydride having the formula (I) may vary within the range of from 5 to 80%, preferably from 10 to 40%, by weight relative to the compounds (b+c) containing reactive hydrogens according to the Zerewitinoff method.

The polyurethanes according to the present invention may be produced either by the "one-shot" single-step technique, or by the pre-polymer technique. In the first case, for example, non-cellular polyurethanes may be advantageously produced by reacting polyisocyanate, polyol, chain extender, and aromatic anhydride of formula (I) in one single step, with the polyol, the chain extender, and the aromatic anhydride of formula (I) being, if desired, pre-mixed.

According to the pre-polymnerization technique, a prepolymer is first prepared from the polyisocyanate, the high-molecular-weight polyol, and if desired all or a portion of the aromatic anhydride of formula (I), and the so-formed pre-polymer is subsequently reacted with the chain extender and the balance of the aromatic anhydride.

The components taking part in the reaction are preliminarily outgassed for the purpose of removing any existing air bubbles; this, in particular, in the case of the separate preliminary reaction of organic polyisocyanate with the anhydride of formula (I), wherein an evolution of $CO_2$ occurs due to the reaction of said anhydride with the polyisocyanate.

Preparation of polyurethane, according to the present invention, may also be carried out as a continuous process by using an extruder, wherein the ease of applying a vacuum may secure the advantage of removing the possibly still-present $CO_2$ after the preparation of the reaction product of polyisocyanate with the anhydride of formula (I), without the end product being foamed.

However, the polyurethane of the present invention is preferably prepared by the so-called prepolymer method.

According to this technique, the polyisocyanate and the aromatic anhydride of formula (I) are preliminarily reacted until the evolution of $CO_2$ ceases, at a temperature of from 50° to 250° C., preferably from 100° to 210° C. Then, to the above said reaction mixture the polyol is added at a temperature of from 50° to 150° C., for a time of from 30 to 150 minutes.

The chain extender is then added, and the homogenized mixture is poured into a mold, and is aged at a temperature higher than 150° C.

The process may be carried out in the presence of a catalyst, if desired, to be introduced into the reaction mixture.

All catalysts known in the art which catalyse the reaction of the isocyanate group with the reactive hydrogencontaining compound may be used; a detailed list of such catalysts is reported, e.g., in U.S. Pat. No. 2,620,516, U.S. Pat. No. 2,621,166, and U.S. Pat. No. 2,729,618, herein incorporated by reference.

The starting materials used in the preparation of thermoplastic polyurethane have been long known; e.g., from U.S. Pat. No. 3,356,650.

As to the organic polyisocyanates, for illustrative and exemplifying purposes the following may be mentioned: methylenediphenyl-diisocyanate 2,4'- and 4,4'-isomers and their mixtures, m- and p-phenylene-diisocyanates, chlorophenylene-diisocyanates, alpha,alpha'-cylylene-diisocyanate, 2,4- and 2,6-toluene-diisocyanate and their mixtures, toluidine-diisocyanate, hexamethylene-diisocyanate, 1,5-naphthalene-diisocyanate, isophorone-diisocyanate, methylene-bis(cyclohexyl-isocyanate), its 4,4'- and 2,4-isomers and their mixtures. Preferred diisocyanates are 2,4- and 2,6-toluene-diisocyanate in 80/20 ratio, and 4,4'-methylenediphenyl-diisocyanate.

As to the polyols having a molecular weight higher than 400, for exemplifying purposes the following may be mentioned: polyol-polyethers, polyol-polyesters, amine-terminated polyethers, hydroxyl-terminated polycarbonates, hydroxyl-terminated polybutadienes, hydroxyl-terminated polybutadiene-acrylonitrile copolymers, amine-terminated polybutadiene-acrylonitrile copolymers, hydroxyl-terminated copolymers of dialkyl-siloxane and alkylene oxides, etc.

Among polyol-polyethers, there may be mentioned the polyoxyethylene glycols, polyoxypropylene glycols, possibly modified with terminal ethylene oxide, block copolymers or random copolymers of ethylene oxide and propylene oxide, propoxylated tri- and tetra-hydroxy alcohols, such as glycerol, trimethylolpropane, pentaerythritol, and the like, possibly capped with ethylene oxide; polytetramethylene glycol, block copolymers or random copolymers of tetrahydrofuran and of ethylene oxide and/or of propylene oxide, as well as derivatives from the reaction of said polyol-polyethers with polyfunctional polycarboxy acids and/or esters of polyfunctional polycarboxy acids.

Illustrative examples of polyol-polyesters are those compounds which are prepared by means of polymerization of epsilon-caprolactone, with ethylene glycol, ethanolamine, and the like, being used as an initiator; and those which are prepared by means of the esterification of polycarboxy acids, such as phthalic acid, terephthalic acid, succinic acid, glutaric acid, adipic acid, azelaic acid and the like, with polyhydroxyalcohols, such as ethylene glycol, butanediol, glycerol, trimethylolpropane, 1,2,6-hexanetriol, cyclohexanedimethanol, and the like.

Illustrative examples of amine-terminated polyethers are the primary aliphatic di- and tri-amines structurally derived from polyoxypropylene glycols or triols, marketed under the trademark JEFFAMINE by Jefferson Chemical Co., U.S.A.

Illustrative examples of hydroxyl group-containing polycarbonates are those prepared by means of the reaction of diols, such as propane-1,3-diol, butane-1,4-diol, hexane-1,6-diol, diethylene glycol, triethylene glycol, dipropylene glycol, and the like, with diaryl-carbonates, such as diphenylcarbonate, or with phosgene.

Illustrative examples of silicon-containing polyethers are the copolymers of alkylene oxides with dialkylsiloxanes.

Illustrative examples of hydroxyl-terminated polybutadiene copolymers are compounds available under the tradename "Poly BD Liquid Resins" from Arco Chemical Co.

Illustrative examples of hydroxyl- and amine-terminated butadiene/acrylonitrile copolymers are the materials available under the trade name of "HYCAR", with terminal hydroxyl groups (HT) and with terminal amino groups (AT).

The preferred polyols are the difunctional or trifunctional polyol-polyethers, or their mixtures, having a molecular weight from 500 to 10,000, and preferably from 1,000 to 6,000.

The chain extenders are constituted by straight-chain or branched-chain aliphatic diols, inclusive of the cycloaliphatic diols, preferably containing from 2 to 8 carbon atoms, and having a molecular weight lower than 400.

Illustrative examples of above-said diols are: ethylene glycol, 1,3-propane-diol, 1,4-butane-diol, 1,5-pentanediol, 1,6-hexane-diol, 1,2-propane-diol, 1,3-butane-diol, 2,3-butane-diol, 1,3-pentane-diol, 1,2-hexane-diol, 3-methylpentane-1,5-diol, 1,4-cyclohexane-dimethanol, and the like, their mixtures being included.

As the di-hydroxy chain extenders the following may be used: diethylene glycol, dipropylene glycol, tripropylene glycol, ethanolamine, N-methyl-diethanolamine, N-ethyl-diethanolamine and the like; as well as the ester diols obtained by the esterification of the above said diols with such acids as adipic acid, azelaic acid, glutaric acid, and the like, or the adducts with ε-caprolactone. Preferred are: 1,4-butane-diol, ethylene glycol, diethylene glycol and 1,4-cyclohexane-dimethanol.

All of the above-said compounds may be used either alone or as mixtures with one another.

The mixture of the organic compounds (polyols +chain extender) containing the hydrogen reactive with isocyanate, according to the Zerewitinoff method, has an average molecular weight lower than 500 and preferably lower than 300. The ratio of NCO to OH groups is from 0.7 to 1.3, and preferably from 0.9 to 1.1.

The formulation of polyurethanes according to the present invention may also comprise the incorporation of various additives, such as fillers, anti-oxidizing agents, pigments, flame retardant agents, plasticizers, and the like as customarily used in the above-said compositions.

The thermoplastic polyurethanes of the present invention may be finally obtained, as above said, both in non-cellular and in cellular form. This latter form may be obtained by applying methods well known per se to those skilled in the art. For example, a foaming agent may be incorporated in the reaction mixture at the polyurethane preparation time. It is preferably constituted by a volatile organic liquid, which flashes off during the exothermic reaction which occurs during polyurethane formation. Said liquids should be insert relative to the reactants taking part in the reaction, and furthermore in no way should they interfere with the desired reaction process. Their boiling point is from about -20° to 110° C. Illustrative examples are: butane, hexane, heptane, methylene chloride, chloroform, monochlorotrifluoromethane, chlorodifluoromethane, dichlorodifluoromethane, and the like.

Finally, the cellular form may be obtained during the shaping step by extrusion of corresponding flakes or pellets, etc., of thermoplastic polyurethane, by using an inert foaming gas during such a step, such as nitrogen, air, $CO_2$, etc.

The following examples illustrate the present invention in still greater detail; they are supplied for illustrative purposes only, and are not intended to be limitative of the invention.

In the examples, all parts, percentages and ratios are by weight unless differently stated.

In the examples, furthermore, the following abbreviations are used:

| | |
|---|---|
| MDI = | 4,4'-methylenediphenyldiisocyanate; |
| Glendion FG 5961 = | trifunctional polyoxypropylene-polyoxyethylene with a molecular weight of 6000, produced by Montedipe S.p.A., Milano, Italy; |
| BTD = | 1,4-butanediol; |
| AT = | trimellitic anhydride. |

EXAMPLE 1

(Comparative Example)

The following starting materials, indicated as grams, were used:

| | |
|---|---|
| MDI | = 86.9 |
| Glendiol FG 5961 | = 13.1 |
| AT | = 31.0 |

The product was prepared as follows:

The polyol (Glendion FG 5961) was dehydrated under vacuum and under stirring, for 1 hour at 80° C.; then MDI was added, the prepolymer preparation reaction being performed at 80° C., under vacuum and under stirring, for 1 hour; after which time, butanediol was added. The obtained mixture was strongly shaken for 15 seconds; it was then poured into a frame-mold at 200° C. and kept under these conditions for 5 minutes.

the features of the obtained product was reported in the Table below.

EXAMPLES 2-4

MDI and AT were first reacted with each other by being mixed at the temperature of 80° C. for 1 hour. The reaction was complete after a treatment at 150° C. for 1 hour, with a subsequent temperature increase to 200°-210° C., and a stay of approximately 30 minutes at this temperature. After such a step, the prepolymer was prepared, according to the procedure as described in Example 1, at the temperature of 80° C. After butanediol addition, the mixture was shaken for 20-25 seconds, poured into a frame-mold at 160° C. and kept therein for 10 minutes.

In the examples the amounts of starting materials (expressed as grams) were used, and polyurethanes were obtained which have the characteristics as summarized in the following Table.

TABLE

| Reactants | | | EXAMPLES | | | |
|---|---|---|---|---|---|---|
| | | | 1 | 2 | 3 | 4 |
| MDI, g | | | 86.9 | 82 | 77.2 | 86.2 |
| GLENDION FG 5961, g | | | 13.1 | 13.1 | 13.1 | 13.8 |
| BTD, g | | | 31 | 27.7 | 24.2 | 24.6 |
| AT, g | | | — | 3.3 | 6.6 | 13.1 |
| PROPERTIES | METHOD | UNIT | | | | |
| Flexural Modulus at 23° C. | ASTM D790 | MPa | 1800 | 1840 | 1810 | 1780 |
| IZOD Impact Strength, with notch, at 23° C. | ASTM D256-56 | J/m | 800 | 850 | 800 | 750 |
| Heat Distortion Temperature (HDT) under 1.82 MPa | ASTM D648-56 | °C. | 80 | 88 | 95 | 110 |

What is claimed is:

1. A process for the manufacture of a thermoplastic polyurethane showing an improved heat distortion resistance, consisting essentially of the following steps:
   (a) reaction of an organic polyisocyanate, at 50°-250° C. and until the $CO_2$ release comes to an end, with at least one aromatic anhydride, optionally bearing carboxylic substitutive groups, and having the formula:

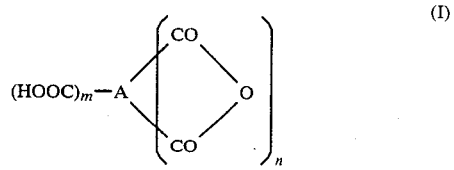

where A represents a substituted or unsubstituted aromatic radical containing from 6 to 20 carbon atoms, m is 0 or an integer from 1 to 3, and n is an integer equal to 1 or 2;
   (b) addition to the above mixture, at 50°-150° C., of at least one polyol, reactive with said polyisocyanate and having a molecular weight higher than 400;
   (c) addition of a chain extender having a molecular weight lower than 400; and
   (d) pouring the homogenized mixture into a mold, where it is aged at a temperature higher than 150° C.

2. A process according to claim 1, wherein the temperature of step a) is from 100° to 210° C. and wherein the time required by step b) is from 30 to 150 minutes.

3. A process according to claim 1, wherein the amount of said anhydride is at least 5% by weight, with respect to the sum of said polyol and said chain extender.

4. A process according to claim 1, wherein said aromatic anhydride is trimellitic anhydride.

5. A process according to claim 1, wherein said aromatic anhydride is pyromellitic anhydride.

6. A process according to claim 3, wherein the amount of said aromatic anhydride is from 5 to 80%, with respect to said sum.

7. A process according to claim 3, wherein the amount of said aromatic anhydride is from 10 to 40%, with respect to said sum.

8. A process according to claim 1, wherein said organic polyisocyanate is 2,4- and 2,6-toluenediisocyanate, in a 80/20 ratio, or 4,4'-methylene-diphenyl-diisocyanate.

9. A process according to claim 1 characterized in that said polyol reactive with polyisocyanate is a difunctional polyether-polyol, having a molecular weight from 500 to 10000.

10. A process according to claim 1 characterized in that said polyol reactive with polyisocyanate is a difunctional polyether-polyol, having a molecular weight from 1000 to 6000.

11. A process according to claim 1, characterized in that said chain extender is a straight-chain or branched-chain aliphatic diol containing from 2 to 8 carbon atoms.

12. A process according to claim 1, wherein the mixture of said polyol and of said chain extender has an average molecular weight lower than 500.

13. A process according to claim 1, wherein the mixture of said polyol and of said chain extender has an average molecular weight lower than 300.

* * * * *